(12) United States Patent
Wuebbels et al.

(10) Patent No.: US 6,298,643 B1
(45) Date of Patent: Oct. 9, 2001

(54) MACHINE FOR MOWING AND CHOPPING CORN AND SIMILAR STALK-LIKE HARVESTED CROPS

(75) Inventors: Richard Wuebbels, Rhede; Norbert Wolters, Gescher, both of (DE)

(73) Assignee: Maschinenfabrik Kemper GmbH & Co. KG, Stadtlohn (DE)

( * ) Notice: Subject to any disclaimer, the term of this patent is extended or adjusted under 35 U.S.C. 154(b) by 0 days.

(21) Appl. No.: 09/434,421

(22) Filed: Nov. 4, 1999

(30) Foreign Application Priority Data

Nov. 18, 1998 (DE) .......................................... 298 20 638 U

(51) Int. Cl.[7] .................................................. A01D 45/02
(52) U.S. Cl. .................................. 56/60; 56/119; 56/503
(58) Field of Search .................................. 56/53, 60, 119, 56/500, 503; 172/35, 518

(56) References Cited

U.S. PATENT DOCUMENTS 5,237,804 * 8/1993 Bertling .................................... 56/60
6,119,443 * 9/2000 Rauch ....................................... 56/64

* cited by examiner

Primary Examiner—H. Shackelford
(74) Attorney, Agent, or Firm—Jordan and Hamburg LLP

(57) ABSTRACT

A machine for mowing and chopping corn and similar stalk-like harvested crops has a number of drawing-in and mowing drums which rotate about a vertical axis and which are provided with protruding driver gear rims. The drawing-in and mowing drums are disposed in the transverse direction on either side of the vertical longitudinal center plane of the machine centrally ahead of a chopper which has an insertion duct which takes up the cut, harvested crops. The insertion duct is bounded above and below by two insertion rollers disposed at a height from one another and laterally by two conveying drums which are at a transverse distance from one another. The conveying drums transport the cut, harvested crops along and rotate about vertical axes. Each of the two lateral guiding drums is divided transversely to its vertical axis into a lower and an upper drum body, each with its own axis of rotation, and the two axes of rotation of the drum bodies are offset relative to one another in the transverse direction in such a manner that the upper drum body can be brought into a working position in which the crown circle of its driver gear rims is at a larger distance from the center of the insertion duct, which coincides with the vertical longitudinal center plane of the machine, than is the crown circle of the driver gear rim of the lower drum body.

23 Claims, 3 Drawing Sheets

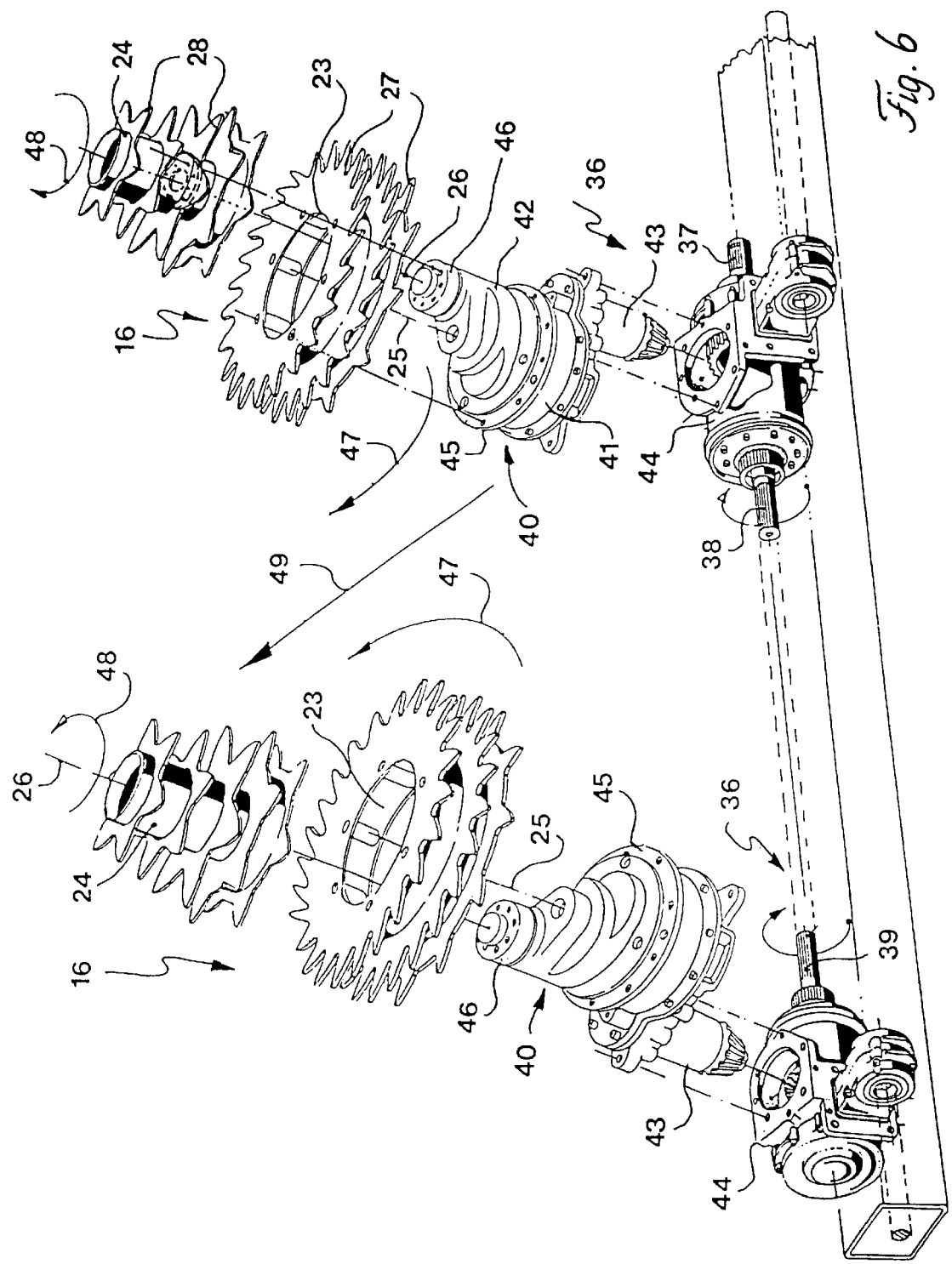

MACHINE FOR MOWING AND CHOPPING CORN AND SIMILAR STALK-LIKE HARVESTED CROPS

BACKGROUND OF THE INVENTION

Figure 1:
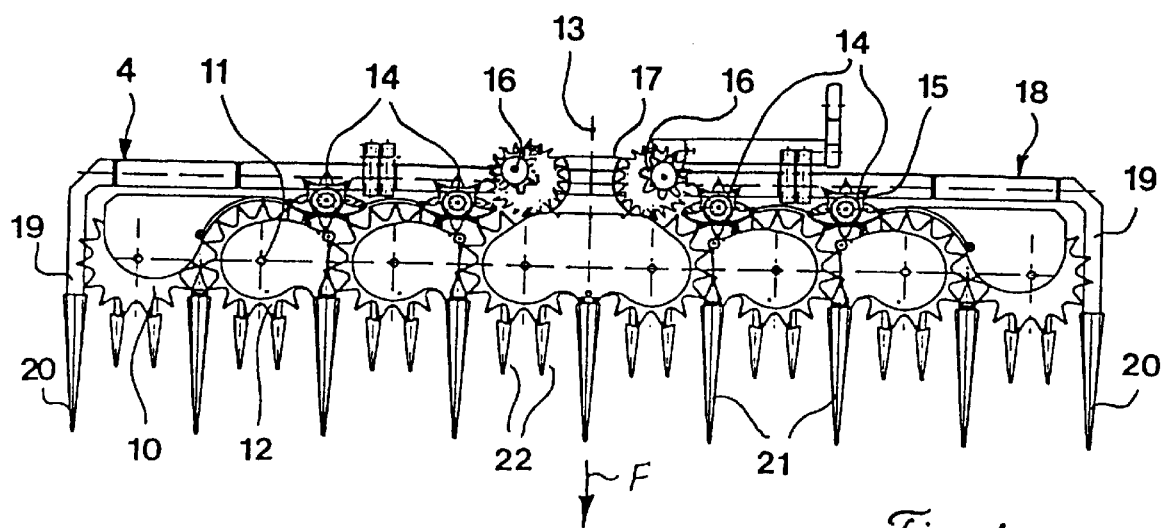

The invention relates to a machine for mowing and chopping corn and similar stalk-like harvested crops.

For such machines, the stalks of the harvested crops are drawn in in the upright position by drawing-in and mowing drums and mown and subsequently supplied to the chopper by the insertion duct, which takes up the cut, harvested crops. In the course of rationalizing the harvesting operation, large, self-propelled field choppers with high outputs are used, the chopper with its knife drum or similar chopping tool being dimensioned correspondingly large. For the chopping tool, this requires a wide insertion duct for the cut, harvested crops with fitting dimensions transversely to the driving direction of the chopper.

An insertion duct, broadened in this manner, presents difficulties during the harvesting operation owing to the fact that the conveying drums, laterally bounding the insertion duct, convey the harvested crops, transported along, mainly in the central region of the insertion duct, while the two outer regions are not supplied. This uneven supplying of the harvested crops results, on the one hand, in uneven wear of the chopping tool and, on the other, due to the concentration of large masses of material in the central region of the insertion duct, overloading of the chopper can occur, which leads to a response of the safety couplings usually provided and, with that, to interruptions of the operation, which delay the harvesting operation.

Attempts to load the insertion duct uniformly over the whole width of the duct with harvested crops simply by placing the lateral conveying drums further apart transversely to the driving direction, were unsuccessful since, by these means, the insertion duct and, with that, the correspondingly wide chopper drum were filled mainly in the two outer, lateral end regions of the insertion duct, while the center of the duct is under-supplied in this case with harvested crops. Uneven wear, associated with the danger of frequent stoppages because of overloading, once again arises this way.

SUMMARY OF THE INVENTION

It is an object of the invention to provide a machine of the type given above, which ensures that the insertion duct of the chopper, especially a wide insertion duct of a high performance chopper, which is dimensioned correspondingly large, is supplied uniformly with the cut, harvested crops.

Owing to the fact that, for this development, the two lateral conveying drums are divided transversely to their vertical axis in each case into an upper and a lower drum body and that the two axes of rotation of the drum bodies of each conveying drum are offset to one another in the transverse direction in such a manner that, in its working position, the upper drum body with its driver gear rim is at a distance from the center of the insertion duct, which exceeds that of the lower drum body, the conveying behavior of the two conveying drums is influenced in such a manner, that the cut, harvested crops, especially in the form of corn plants, are first of all bundled cleanly by the two lower drum bodies of the two conveying drums towards the center of the insertion duct, the possibility being provided to the harvested crops, so bundled, by the outwardly offset upper drum bodies of the two conveying drums to spread out further from the center of the duct towards the outside to the lateral ends of the duct. By these means, the insertion duct is filled uniformly, thus making it possible to enlarge the conveying cross section and, with that, to increase the throughput of harvested crops. As a result, the chopper is no longer stressed non-uniformly and uniform wear results, which favors a long service life of the operating parts of the chopper, and avoids stoppages resulting from overloading the machine by the undesirable balling together of the harvested crops in the regions of the insertion ducts to the chopper.

Advantageously, the conveying behavior of the two lateral conveying drums can further be affected favorably owing to the fact that the two drum bodies of each conveying drum are driven at the same peripheral speed. By these means, a uniform flow of material is maintained in the region of the insertion duct.

Further characteristics and advantages of the invention arise out of the claims and the specification below in conjunction with the drawing, in which an example of the object of the invention is illustrated in greater detail diagrammatically.

IN THE DRAWINGS

Figure 2:
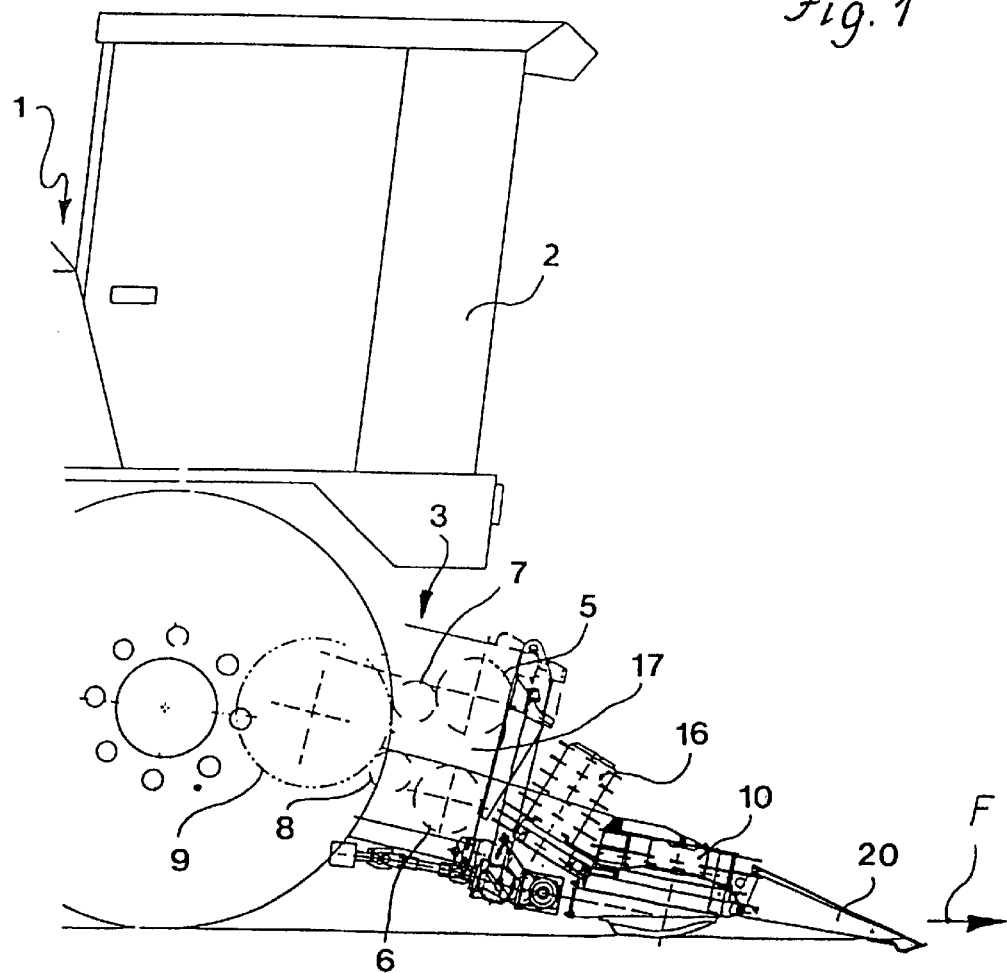
Figure 3:
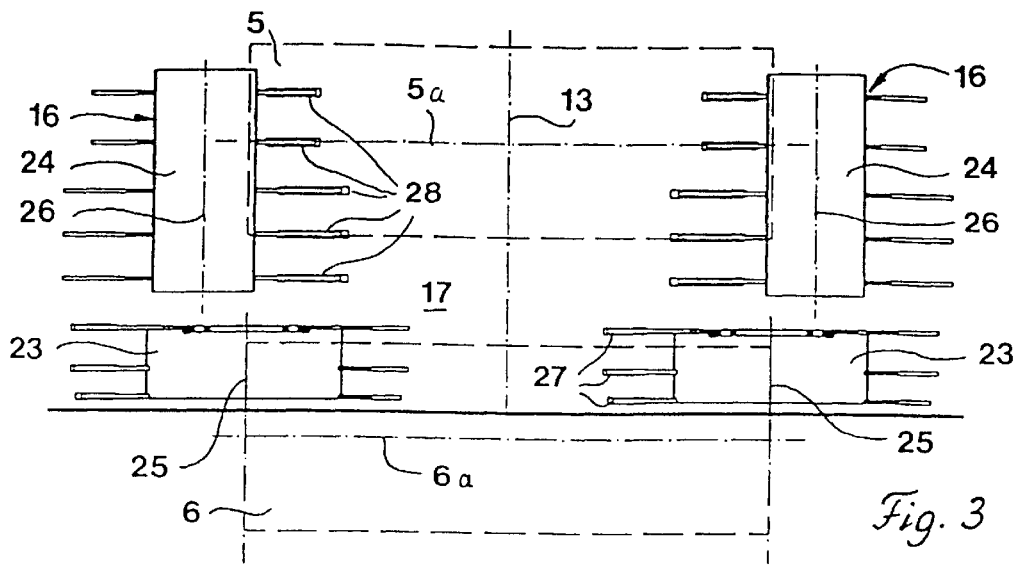
Figure 4:
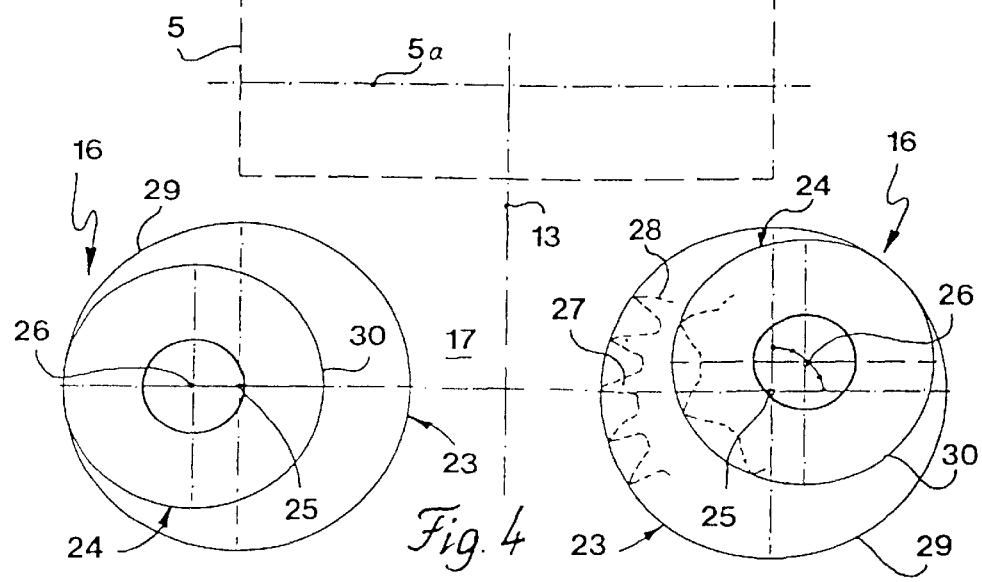
Figure 5:
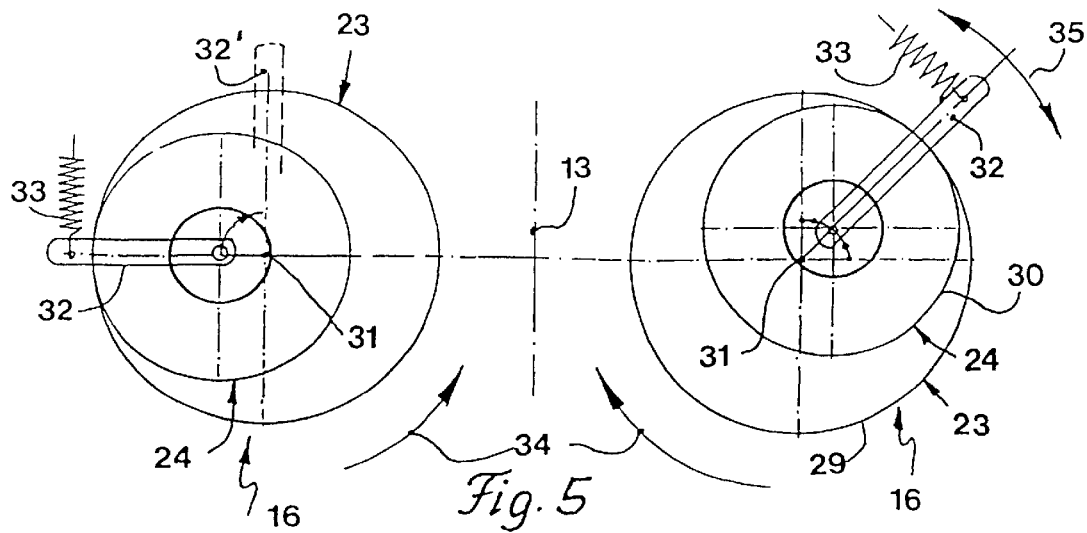

FIG. 1 shows a plan view of a machine for mowing corn and similar stalk-like harvested crops as an attachment to a self-propelled field chopper, FIG. 2 shows a side view of the mowing machine of FIG. 1, in a state attached at the front to a field chopper and forming a mowing and chopping unit, FIG. 3 shows a front view of the region of the mowing machine, adjoining the insertion duct of the chopper, on an enlarged scale, FIG. 4 shows a plan view of the machine region of FIG. 3, FIG. 5 shows a plan view of the conveying drum of the machine region of FIG. 4, to illustrate a modified embodiment, and FIG. 6 shows a view of the driving system of the two conveying drums in an exploded, perspective representation.

DESCRIPTION OF THE PREFERRED EMBODIMENTS

As is evident initially from FIGS. 1 and 2 of the drawing, a machine for mowing and chopping corn and similar stalk-like harvested crops, which is labeled 1 as a whole, comprises a field chopper in the form of a self-propelled vehicle 2 with a chopper 3 and a mowing machine, which is labeled 4 as a whole and is intended for mowing the harvested crops independently of the row, as a mowing attachment in the form of an add-on unit for the vehicle 2 constructed as a tractor.

In relation to the mowing machine 4, the chopper 3 is disposed centrally and has a pair of front insertion rollers 5 and 6 and a pair of rear roughly pressing rollers 7 and 8, between which the mown harvested crops are supplied to the chopper blower, which is shown only with one knife drum or chopping drum 9 and in which the harvested crops are comminuted and conveyed over a blast pipe, for example, into an agricultural self-loading forage box.

The mowing machine 4, moved forwards, in accordance with FIG. 1, by vehicle 2 in the working or driving direction of arrow F comprises, for the example shown, a total of eight drawing-in and mowing drums 10 which, when operating, rotate about a vertical axis 11 and are provided with protruding driver gear rims 12. In the transverse direction, the drawing-in and mowing drums 10 are disposed in the transverse direction on either side of the vertical longitudinal center plane 13 of the machine 4 centrally ahead of the chopper 3. In the driving direction F, behind the drawing-in and mowing drums 10, transverse conveying drums 14 are additionally provided for supporting the conveying motion of the cut harvested crops to the chopper 3. In the operating state, these transverse conveying drums 14 in turn rotate about a vertical axis and are provided with protruding driver gear rims 15.

Also in the driving direction F behind the drawing-in and mowing drums 10, there are two further conveying drums 16, which are disposed in the vicinity of the insertion rollers 5, 6 of the chopper 3 and laterally form the boundary of an insertion duct 17 for the harvested crops between the insertion rollers 5, 6, which are disposed at a distance from one another, one above the other. As can be seen particularly in FIG. 2, the two conveying drums 16 are constructed as inclined conveying drums, sloping forwards in the driving direction F. They bridge a vertical distance between the working plane of the drawing-in and mowing drums 10 and the horizontal plane of the insertion duct 17 and have an arrangement and configuration for taking over the harvested crops from the drawing-in and mowing drums 10 and supplying it to the insertion duct 17.

The drawing-in and mowing drums 10, including the conveying drums 14 and 16, are surrounded and supported at the sides and at the rear by a machine frame 18, which is open at the front side, as viewed in the direction of driving F. The machine frame 18 comprises lateral guides 19, which together determine the working width of the machine 4. In each case, the lateral guides 19 run out at the front into a divider point 20, act as a leaf lifter for the harvested crops and make preparations for the mowing cut. Within the working width of the machine 4, there are further divider points 21 having the same length as the divider points 20 and, between them, shorter divider points 22 are disposed, which are fastened in a manner, the details of which are now shown, to the underside of the machine frame 18.

Reference is now made to FIGS. 3 and 4, in which the machine region, defining the insertion duct 17 for the cut, harvested crops, is shown strictly diagrammatically on an enlarged scale. The upper and lower insertion rollers 5, 6 each of which, during the operation of the machine, revolves about a horizontal axis of rotation 5a and 6a respectively, are only indicated by broken lines. It can be seen that the conveying drums 16, which form the lateral boundary of the conveying duct 17, are divided transversely to their vertical axis in each case into a lower drum body 23 and an upper drum body 24, in each case with their own axis of rotation 25 and 26 respectively defining the vertical axis.

As furthermore shown in FIGS. 3 and 4, the two drum bodies 23, 24 of each conveying drum 16, in the operating position shown, are offset to one another transversely to the vertical longitudinal center plane 13 of the machine 4 in such a manner, that the upper drum body 24 is at a larger distance from the center plane of the insertion duct 17, coinciding with the vertical longitudinal center plane 13, than is the lower drum body 23. By these means, the insertion duct 17 is constricted towards the insertion rollers 5, 6 in the lower region and expanded in the upper region.

The height of the upper drum body 24 can be about three times the height of the lower drum body 23, while the diameter of the upper drum body 24 is only about half the diameter of the lower drum body 23.

Like the drawing in and mowing drums 10, as well as the transverse conveying drums 14, the conveying drums 16 are provided with driver gear rims 27 and 28 for moving the cut, harvested crops. Of these, the driver gear rims 27 are fastened to the lower drum bodies 23 and the driver gear rims 28 are fastened to and in each case at a vertical distance from the upper drum bodies 24. The diameter of the crown circle 29 of the driver gear rims 27 of the lower drumbody 23 is, in the example shown, about 1.2 to 1.6 times the diameter of the crown circle 30 of the driver gear rims 28 of the upper drum body 24 which, in other respects, as shown in FIG. 3, can have a staggered crown circle diameter dimension, which becomes smaller in the upwards direction.

The arrangement and dimension of the two drum bodies 23, 24 with their driver gear rims 27, 28 are selected here so that the crown circles 29, 30 of their driver gear rims 27, 28 are offset transversely only in their region facing the center of the conveying duct; on the other hand, in their region averted from the center of the conveying duct, they essentially coincide. This ensures a proper coordination of the driver gear rims 27, 28 with the driver gear rims 15 of the transverse conveying drums 14, which are constructed normally, that is, without any offset.

A maximum setting of the transverse offset of the upper drum body 24 can be seen particularly from the left conveying drum 16, shown in FIG. 4. The axes of rotation 26 of the upper drum body 24 and the two axes of rotation 25 of the lower drum bodies 23 lie in a common transverse plane here in relation to the center of the conveying duct or the vertical longitudinal center plane 13 of the machine. This can be a fixed setting, which is not changed while the machine is being operated. A further setting of the upper drum body 24, which is fixed in relation to the lower stationary drum body 23 and cannot be varied during the operation of the machine, is shown for the right conveying drum 16 in FIG. 4. According to this, the upper drum body 24 is swiveled about an axis, which coincides with the axis of rotation 25 of the lower drum body 23, in a direction pointing away from the vertical longitudinal center plane 13, that is, towards the outside, in order to adapt to a given width of the insertion duct 17, and fixed at the machine.

Further possibilities for varying and adapting are offered by an embodiment according to FIG. 5, for which the lower drum body 23 is supported in a stationary manner and the upper drum body 24 is supported, so that it can be swiveled about the fillcrum, which is labeled 31 here and coincides with the axis of rotation 25 of the lower drum body 23, by the harvested crops transported along from a basic position against the force of a spring toward the outside. By these means, the operating position of the upper drum body 24, in particular, can be adapted to different forage flows during the operation of the machine.

For swiveling against the force of a spring, the upper drum body 24 of the representation in FIG. 5 is provided with a lever 32, the radially outer end of which is engaged by a tension spring 33 and the other end of which is held at the machine in a manner, the details of which are not shown. The pivotability of the upper drum body 24 relative to the lower drum body 23 under the pressure of the flow of the harvested crops conveyed laterally into the insertion duct 17 in accordance with the movement arrows 34 from a basic position, illustrated by a line of dots and dashes in the case of the left conveying drum 16 in FIG. 5 by the lever end 32' from the longitudinal center plane 13 towards the outside about the fulcrum 31 extends up to the maximum position, which is shown for the left conveying drum 16 in FIG. 5 and corresponds to the maximum position of FIG. 4 (left conveying drum 16).

In the case of the right conveying drum 16 in FIG. 5, the upper drum body 24, as a further example, is shown in a position swiveled about the axis of rotation 31 corresponding to the width of the insertion channel 17 by 45° from the basic position towards the outside relative to the lower drum body 23. The swiveling angle can be limited by stops in accordance with the width of the insertion channel 17. The double arrow drawn illustrates the swiveling of the drum body 24 under the pressure of the flow of harvested crops towards the outside and the swiveling back towards the inside, which takes place when the pressure of the flow of harvested crops ceases, towards the center of the insertion duct by the pre-stressed tension spring 33 returning to its initial position.

The two drum bodies 23 and 24 of each conveying drum 16 are rotatably supported in a common transmission unit 36, which can be driven by the main driving shaft of the chopper 3. and is shown in FIG. 6. The right transmission unit 36 in FIG. 6 is driven over a connecting cog 37, with which a driving connection can be established in a known manner with the central transmission of the chopper 3. The two transmission units 36, shown in FIG. 6, are constructed essentially identically. There is a driving connection from one connecting cog 38 of the right transmission unit 36 in FIG. 6 through a connecting shaft to a connecting cog 39 of the left transmission unit 36 in FIG. 6.

The transverse offset of the two drum bodies 23, 24 is attained by a displacement transmission 40, which is integrated in the transmission unit 36 and comprises a lower spur gearing 41 and an upper spur gearing 42 which, with their two transmission elements, define the two axes of rotation 25 and 26 of the two drum bodies 23 and 24. At the same time, the displacement transmission 40 is constructed as a translation transmission gearing in such a manner that during the operation of the machine, the driving gear rims 27, 28 of the lower drum body 23 and the upper drum body 24 have the same peripheral speeds.

With a connecting cog 43, the displacement transmission 40 is inserted into a connecting transmission 44 having the connecting cog 37 or 39 for transmitting the driving power and otherwise comprises a mounting flange 45 for a bolted connection with the lower drum body 23, as well as a mounting flange 46 for a bolted connection with the upper drum body 24, as illustrated by lines of dots and dashes in FIG. 6. The directions of rotation of the two drum bodies 23 and 24 are indicated by arrows 47 and 48, while the insertion duct 17 is indicated by a movement arrow 49.

What is claimed is:

1. A machine for mowing and chopping stalk-like crops comprising:
   a frame;
   drawing-in and mowing drums supported on said frame for rotation about generally upright axes;
   a chopper on said frame, said chopper having an insertion duct;
   said chopper further including a pair of spaced conveying drums, each of said conveying drums including an upper drum section and a lower drum section, said lower drum section being rotatable about a first axis, said upper drum section being rotatable about a second axis, said first and second axes being parallel to one another and spaced from one another, said conveying drums being operable to receive the cut crop from the drawing-in and mowing drums and to supply the cut crop to said insertion duct.

2. A machine according to claim 1 wherein said lower drum section includes a first drum body part and a plurality of first driver elements for engaging the cut crop, said upper drum section including a second drum body part and a plurality of second driver elements for engaging the cut crop, said first drum body part having a first diameter, said second drum body part having a second diameter, said first diameter being greater than said second diameter.

3. A machine according to claim 2 wherein said first diameter is about twice said second diameter.

4. A machine according to claim 1 wherein said lower drum section has a first axial height, said upper drum section having a second axial height, said second axial height being greater than said first axial height.

5. A machine according to claim 4 wherein said second axial height is about three times greater than said first axial height.

6. A machine according to claim 1 wherein each of first and second parallel axes are inclined upwardly and forwardly relative to vertical.

7. A machine for mowing and chopping stalk-like crops while moving in a forward direction comprising:
   a frame having a central axis generally parallel to said forward direction;
   drawing-in and mowing drums supported on said frame on both sides of said central axis for rotation about generally upright axes;
   a chopper on said frame, said chopper having spaced insertion rolls and an insertion duct between said spaced insertion rolls;
   said chopper further including a pair of spaced conveying drums, each of said conveying drums including an upper drum section and a lower drum section, said lower drum section being rotatable about a first axis, said upper drum section being rotatable about a second axis, said first and second axes being parallel to one another and spaced from one another, said conveying drums being operable to receive the cut crop from the drawing-in and mowing drums and to supply the cut crop to said insertion duct.

8. A machine according to claim 7 wherein said insertion rolls are rotatable about generally horizontal axes.

9. A machine according to claim 7 wherein said first and second axes are transversely aligned in a direction generally perpendicular to said central axis.

10. A machine according to claim 7 wherein said insertion duct has a central insertion duct axis generally coincident with said central axis of said frame, said lower drum section including a plurality of first driver elements for moving the cut crop, said first driver elements defining a first outer crown circle, said upper drum section including a plurality of second driver elements for moving the cut crop, said second driver elements defining a second outer crown circle, said first crown circle being spaced from said central insertion duct axis a first distance, said second crown circle being spaced from said central insertion duct axis a second distance, said second distance being greater than said first distance.

11. A machine according to claim 10 wherein said first crown circle has a first diameter, said second crown circle having a second diameter, said first diameter being greater than said second diameter.

12. A machine according to claim 11 wherein said first diameter is about 1.2 to 1.6 times greater than said second diameter.

13. A machine according to claim 7 wherein said insertion duct has a central insertion duct axis generally coincident with said central axis of said frame, said lower drum section including a plurality of first driver elements for moving the cut crop, said first driver elements defining a first outer crown circle, said upper drum section including a plurality of second driver elements for moving the cut crop, said second driver elements defining a second outer crown circle, said lower drum section having a first diameter intersecting the first crown circle at a first intersection, said upper-drum section having a second diameter intersecting the second crown circle at a second intersection, said first and second crown circles being disposed in a substantially tangential relationship at said first and second intersections.

14. A machine according to claim 13 wherein said first diameter intersects the first crown circle at a third intersection which is closer to said central axis of said insertion duct than said first intersection, said second diameter intersecting said second crown circle at a fourth intersection which is closer to said central axis of said insertion duct than said second intersection.

15. A machine according to claim 7 wherein said insertion duct has a central insertion duct axis generally coincident with said central axis of said frame, said lower drum section including a plurality of first driver elements for moving the cut crop, said first driver elements defining a first outer crown circle, said upper drum section including a plurality of second driver elements for moving the cut crop, said second driver elements defining a second outer crown circle, said lower drum section having a first diameter perpendicular to said central insertion duct axis, said first diameter intersecting said first crown circle at a first inner intersection and a first outer intersection, said first inner intersection being closer to said central insertion duct axis than said first outer intersection, said upper drum section having a second diameter perpendicular to said central insertion duct axis, said second diameter intersecting said second crown circle at a second inner intersection and a second outer intersection, said second inner intersection being closer to said central insertion duct axis than said second outer intersection, said first and second crown circles being disposed in a substantially tangentially relationship at said first outer intersection and said second outer intersection, said first and second crown circles being displaced from a tangential relationship at said first inner intersection and said second inner intersection.

16. A machine according to claim 7 wherein said lower drum section is supported on said frame for rotation about a fixed axis of rotation which is fixed relative to said frame, said upper drum section including a swivel device for swiveling said upper drum section about a swivel axis coincident with said fixed axis of rotation.

17. A machine according to claim 16 wherein said swivel device includes a biasing device for biasing said upper drum section in one swivel direction.

18. A machine according to claim 17 wherein said biasing device biases said upper drum section in a direction generally toward said central axis.

19. A machine according to claim 16 wherein said swivel device limits swiveling of said upper drum section to less than 180 degrees.

20. A machine according to claim 16 wherein said swivel device limits swiveling of said upper drum section to less than 90 degrees.

21. A machine according to claim 7 wherein said chopper includes a transmission unit having a displacement device for displacing the relative position of said first and second axes.

22. A machine according to claim 7 wherein the machine includes a main driver and a common transmission unit for driving said lower and upper drum sections.

23. A machine according to claim 7 wherein said drawing-in and mowing drums are disposed generally at a first elevation, said insertion duct being disposed generally at a second elevation higher than said first elevation, said conveying drums extending generally between said first and second elevations.

* * * * *